C. J. WHITE.
ELASTIC FABRIC OR WEBBING.
APPLICATION FILED JAN. 25, 1913.
Reissued Aug. 12, 1913. 13,606.
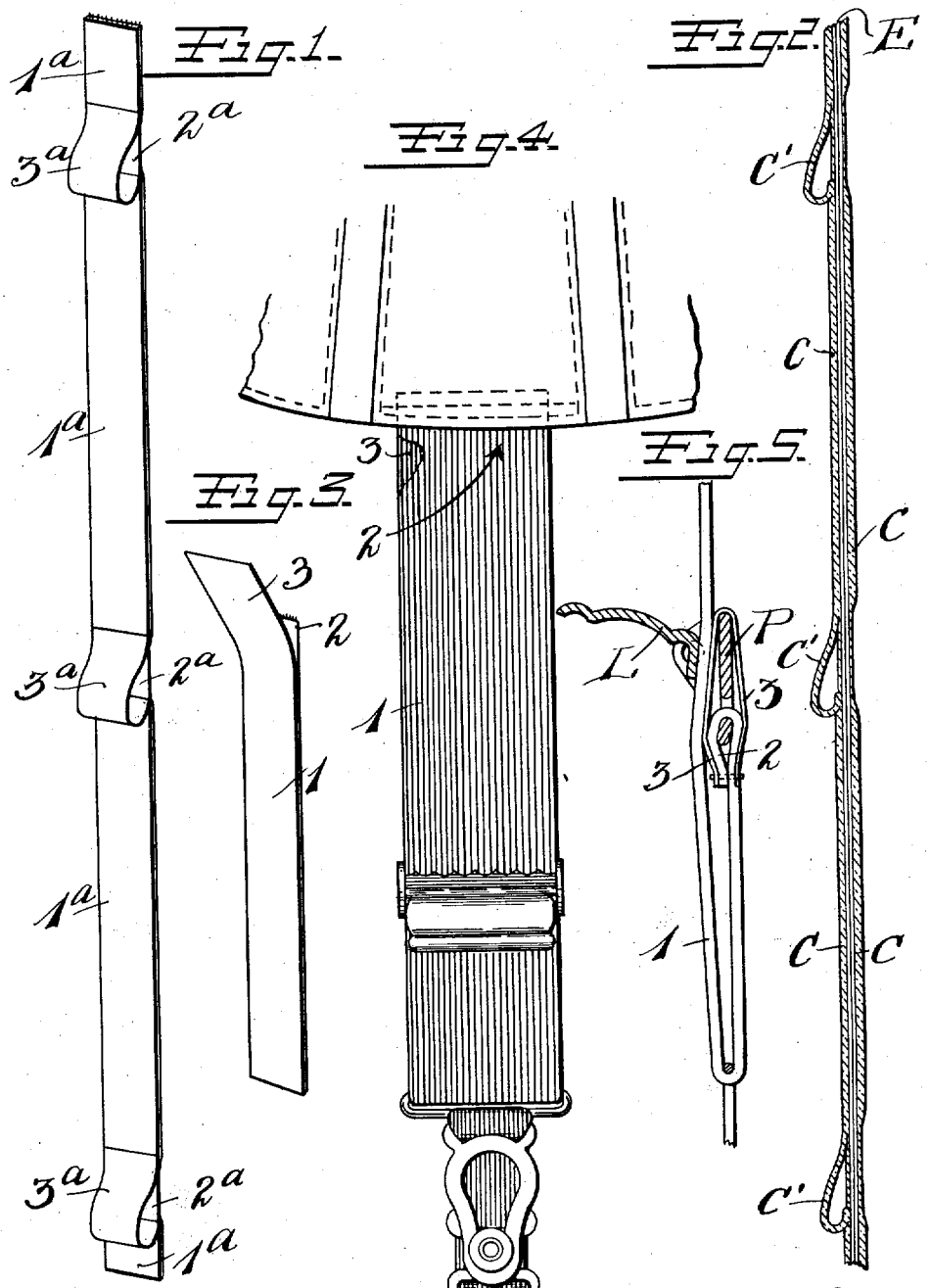
Witnesses:
Inventor
C. J. White
By his Attorneys
COLUMBIA PLANOGRAPH CO., WASHINGTON, D. C.

UNITED STATES PATENT OFFICE.

CHARLES J. WHITE, OF NEW BRITAIN, CONNECTICUT, ASSIGNOR TO C. J. WHITE MANUFACTURING COMPANY, OF NEW BRITAIN, CONNECTICUT, A CORPORATION OF CONNECTICUT.

ELASTIC FABRIC OR WEBBING.

13,606. Specification of Reissued Letters Patent. Reissued Aug. 12, 1913.

Original application filed January 13, 1910, Serial No. 537,831. Divided and application filed April 20, 1910, Serial No. 556,577. Original No. 1,042,632, dated October 29, 1912. Application for reissue filed January 25, 1913. Serial No. 744,267.

*To all whom it may concern:*

Be it known that I, CHARLES J. WHITE, a citizen of the United States, residing at New Britain, Hartford county, Connecticut, have invented certain new and useful Improvements in Elastic Fabric or Webbing, of which the following is a full, clear, and exact description.

My invention relates to a new and improved webbing construction which may be capable of a variety of uses but which has marked utility in connection with garment supporters and the like.

This application is a division from my copending application, Serial No. 537,831, filed January 13, 1910.

In the drawings: Figure 1 is a perspective view of a strip of my improved webbing; Fig. 2 is an edge elevation illustrating diagrammatically the construction of the webbing, the same being shown as abnormally thickened for the purpose of clearer illustration; Fig. 3 is a single length of webbing such as would be employed in a garment supporter; Fig. 4 illustrates a length of webbing such as indicated in Fig. 3 and as applied to use in a hose supporter, said view being partly broken away and relatively enlarged; Fig. 5 illustrates by an edge view another use for my improved webbing.

My improved webbing is mainly elastic but has at one side, and at properly spaced intervals looped-off or branch portions of non-elastic, said looped-off or branch portions being integrally connected with the main body of the webbing and being preferably of greater length than that part of the webbing embraced between the two ends of the looped-off portion, when said webbing is unstretched, the additional length of non-elastic being in certain instances of particular importance and value as will later be seen.

Referring first to Fig. 3, which shows a single length of webbing constructed to embody my invention, it will be understood that 1 is what may be termed the working or elastic part of the webbing while 2–3 are branches, the branch 2 being elastic, the branch 3 being relatively non-elastic. This single length of webbing shown in Fig. 3 is such as would be employed in connection with a hose supporter and the same may be severed from a long strip of webbing such as shown in Fig. 1, which strip may be woven in any desired length. In the strip shown in Fig. 1 the parts that correspond to the parts shown in Fig. 3 are as follows: $1^a$ corresponds to the main working part; $2^a$ represents an elastic portion at the end of the working part $1^a$; while $3^a$ represents the integrally formed looped-off portion, the parts $2^a$ and $3^a$ producing the branches 2 and 3 of Fig. 3 when the long length of webbing is cut off to form the separate short lengths. The webbing, as shown in Fig. 3, is produced in a continuous strip on a suitable loom as usual under substantially full tension and said webbing comprises the elements disclosed in Fig. 2, viz., the core E say, of rubber threads, and the woven yarn or thread covering C for said core. The loops or branches C′ are preferably formed by separating from the main body of the webbing at suitable intervals, a part of the warp threads of the main covering, the same being woven together to produce the relatively non-elastic offset or superposed portion C′. It is obvious that in the weaving of the non-elastic portions C′, a separate shuttle would be employed from the one being used in laying the weft threads in the simultaneous formation of that part of the webbing underlying said superposed non-elastic portions C′. It should be understood, of course, that it is not necessary in all cases that the parts C′ should be actually looped-off or separated from the main body in the particular manner shown. There is, however, a particular advantage in having said loops actually separated throughout their length. Each loop being of such a length as to provide slack when the webbing is unstretched. Webbing so constructed has advantages in a variety of arts and especially in the garment supporter art, for example, it is well known that when a length of elastic webbing is sewed to a support the rubber threads are punctured and thereby weakened on the line of stitching with the result that the webbing gives away at this point prematurely. By providing the non-elastic portion at one side, this portion may be sewed into the support, together with the elastic portion as shown in Fig. 4, wherein one end of webbing is shown as sewed into the lower edge of a corset. It is obvious in this arrangement that the strain will fall upon the non-elastic portion which limits the stretch of the supporter at said secured end, thus relieving the strain on the rubber threads at said point. Again in Fig. 5 I have shown that end of the webbing bearing the looped-off portion 3 as secured to one of the metal supports of a hose supporter. In this instance the metal part is in the form of a lever slide buckle, P representing the back plate and L the clamping lever. The elastic branch of the webbing is passed through a slot in the plate P while the non-elastic branch 3 being of greater length is passed up over the plate P and thence down and sewed or otherwise secured, together with the elastic branch, to the webbing below said support. This view, Fig. 5, is employed to illustrate the advantage of providing the looped-off portion of greater length than the adjacent elastic portion, the principal advantage in this case being that it provides a protective covering for the metallic back of the buckle, thus preventing it from coming in contact with the clothes or the body of the wearer.

What I claim is:

1. As a new article of manufacture, a length of elastic webbing, including a core of rubber and a covering of woven threads, and a non-elastic branch portion adjacent a portion of said webbing formed by some of said threads.

2. As a new article of manufacture, a strip of elastic webbing comprising an elastic core, and a yielding covering of woven thread, and a loop of non-elastic fabric separated from the elastic portion of the webbing and formed of some of the threads employed for covering the elastic core.

3. As a new article of manufacture, a strip of elastic webbing comprising an elastic core and a yielding covering of woven thread, and a loop of non-elastic fabric separated from the elastic portion of the webbing and formed of some of the threads employed for covering the elastic core, said loop being of greater length than the length of elastic webbing between the ends of said loop.

4. An elastic webbing consisting of a flat strip having a main section and a section prolonged therefrom and continuous therewith, in both of which there are elastic strands throughout the length, the first section having a greater number of warp threads therein than the adjacent section and an integral section formed therewith and adjacent to the section having the least number of warp threads and which section is non-elastic and is formed from part of the warp threads of the first section with additional weft threads.

5. An elastic webbing consisting of a flat strip woven under tension and with elastic strands therein throughout its entire length and having an integral woven section superposed thereon at one end and comprising non-elastic warp and weft threads only.

6. A length of elastic webbing woven under tension and at substantially the maximum elastic limit of the webbing and in which at spaced intervals there are also superposed non-elastic sections formed integral therewith and comprising solely non-elastic warp threads and weft threads.

7. A length of elastic webbing woven under tension and at substantially the maximum elastic limit of the webbing and in which there are elastic sections at spaced intervals having a less number of warp threads than the adjacent and intermediate elastic sections and integral juxtaposed sections formed from the balance of the warp threads and additional weft threads and which sections are non-elastic.

8. The methods of weaving elastic webbing in continuous lengths, comprising the weaving of a section in the usual manner with a superabundance of warp threads and for a predetermined length, separating the warp threads so that one series diverges from the other, with the elastic strands in line with the one series, continuing the weaving of the length of elastic webbing, and also with another shuttle and the other series of warp threads weaving a length of webbing that is without elastic strands and non-elastic, removing the second shuttle and bringing all the warp threads again together with the elastic strands and continuing the weaving of the length of elastic webbing and repeating the operations progressively.

CHARLES J. WHITE.

Witnesses:

KATHERINE A. WOODS,
DAVID F. LARSON.

Copies of this patent may be obtained for five cents each, by addressing the "Commissioner of Patents, Washington, D. C."